United States Patent [19]
Shimazaki et al.

[11] Patent Number: 5,748,394
[45] Date of Patent: May 5, 1998

[54] LENS DRIVING DEVICE

[75] Inventors: Yoshio Shimazaki; Tetsuji Emura, both of Hachioji, Japan

[73] Assignee: Konica Corporation, Japan

[21] Appl. No.: 681,119

[22] Filed: Jul. 22, 1996

[30] Foreign Application Priority Data

Jul. 26, 1995 [JP] Japan .................. 7-190488

[51] Int. Cl.⁶ .................. G02B 15/00; G02B 15/14
[52] U.S. Cl. .................. 359/823; 359/822; 359/829
[58] Field of Search .................. 359/811, 813, 359/815, 816, 818–823, 826–830, 694, 696; 354/195.1, 286, 400

[56] References Cited

U.S. PATENT DOCUMENTS

| 5,150,260 | 9/1992 | Chigira | 359/694 |
| 5,177,638 | 1/1993 | Emura et al. | 359/704 |
| 5,225,941 | 7/1993 | Saito et al. | 359/824 |
| 5,363,248 | 11/1994 | Horio | 359/704 |
| 5,377,048 | 12/1994 | Tada et al. | 359/823 |
| 5,392,159 | 2/1995 | Sasaki et al. | 359/691 |

*Primary Examiner*—Frank G. Font
*Assistant Examiner*—Michael P. Stafira
*Attorney, Agent, or Firm*—Jordan B. Bierman; Bierman, Muserlian and Lucas

[57] ABSTRACT

A lens driving device includes a lens frame for holding a photographic lens; a guide member for guiding the lens frame in a direction of an optical axis of the lens; a lead screw for moving the lens frame in the optical axis direction; a drive source for rotating the lead screw; and a carriage for being in pressure contact with the lead screw and thereby for converting a rotational motion of the lead screw caused by the drive source to a linear motion in a direction parallel to the optical axis direction which is a moving direction of the guide member. When pressure contact points between the carriage and the lead screw are projected onto a plane perpendicular to a rotational axis of the lead screw, a projected image includes at least three pressure contact points.

6 Claims, 8 Drawing Sheets

$\alpha, \beta, \gamma < 180°$

LENS DRIVING DEVICE

BACKGROUND OF THE INVENTION

The present invention relates to an optical equipment having a lens optical system, and more particularly, relates to a lens driving device on a lens barrel.

In a common video camera, the most general auto-focus mechanism is to pick up contrast of light which passes a photographing optical system from a CCD which is an image pickup device and moves an a focus lens in the optical system in such a manner that its contrast value becomes the peaks. Here, an inner focusing system which is advantageous for making a camera compact is used. With regard to the driving method of the focus lens in aforesaid optical system, various methods have been disclosed. Among them, a method employing a lead screw is the most common.

As one example thereof, Japanese Patent Publication Open to Public Inspection No. 266311/1990 is shown in FIG. 6(a) (a central cross sectional view) and FIG. 6(b) (a front view). In FIGS. 6(a) and 6(b), nut 17 is provided on lead screw 10 formed on the output shaft of stepping motor 21 as a conversion mechanism for converting rotational movement of aforesaid lead screw 10 to linear movement parallel to the optical axis. In addition, bushing 12 and U-notch 121 provided on moving lens frame 11 is coupled on two guide bars 31 and 32 which are fixed on lens barrel main body in parallel with the optical axis.

By connection portion 22 formed on the above-mentioned moving lens frame 11 movable in the optical axis toward the above-mentioned nut 17 due to force of spring 19, the above-mentioned moving lens frame 11 is moved in the above-mentioned optical axis direction by rotation of the above-mentioned lead screw 10 by the above-mentioned stepping motor 21. Spring 19 functions to eliminate backlash between lead screw 10 and nut 17.

Another example is shown in FIGS. 7(a) (a perspective view) and 7(b) (a front view) disclosed in Japanese Utility Publication Open to Public Inspection No. 71155/1990. This example is the same as the above-mentioned former prior art in that guide bars 31 and 32 are coupled with bushing 12 and U-notch 121 respectively so that they are movable in the optical axis direction and that the above-mentioned moving lens frame 11 is moved in the optical axis direction due to the rotation of lead screw 10 formed on the output shaft of stepping motor 21.

In the latter example, a damper composed of an engaging material which, not a nut, is engaged with lead screw 10 and plate spring 18 for engaging aforesaid engaging material 18 onto the above-mentioned lead screw 10 which causes the damper to bind onto moving lens frame 11 through connection member 20 (for example, a plate spring) which has stiffness in a plane parallel to the optical axis and the lead screw axis and which is also flexible in a direction perpendicular to a plane which concurrently contains the optical axis and the lead screw axis.

In the above-mentioned first conventional example, lead screw 10 must be thrust into a prescribed position from the front edge of lead screw 10 when nut 17 is engaged with lead screw 10. This requires much for assembly time. In addition, when a lens barrel is completed, the front edge of lead screw 10 is supported by pivot shaft bearing 23 as shown in FIG. 6(a). Therefore, nut 17 cannot be removed from the completed product without disassembly. In addition, due to the effects of spring 19, the driving torque necessary for stepping motor 21 changes depending upon the position of the lens.

In the second conventional example, since the damper moves freely in the vertical direction to the axis of lead screw, the damper can be mounted or removed from lead screw 10 at any point, resulting in no inconvenience as in the first conventional example. However, unless lead screw is perfectly parallel to the optical axis (guide bar 31), torsion force is applied to plate spring 20 which is a connection member so that resistance rapidly increases. Therefore, when mass-producing the product, it is necessary to select stepping motor 21 having sufficient torque range, to allow for less than perfect parallelness. This has resulted in an enlarged camera and undesirable vibration or noise by stepping motor 21.

SUMMARY OF THE INVENTION

An object of the present invention is to provide a lens driving device enabling a downsized lens barrel, with a simple structure, minimal assembly cost and capable of moving smoothly without backlash, vibration or noise due to a driving source integrally housing a moving lens frame on aforesaid lens barrel.

The above-mentioned object can be attained by the following structure. (1) A lens driving device having a moving lens frame with an integral lens, a guide which restricts aforesaid moving lens frame in the optical axis direction, a lead screw rotated by a driving source for driving the above-mentioned moving lens frame in the optical axis direction and a conversion mechanism for converting aforesaid rotational movement of the lead screw to linear movement parallel to the above-mentioned guide, wherein, when the points of pressure contact between the above-mentioned conversion mechanism and the above-mentioned lead screw are projected onto a plane perpendicular to an axis of aforesaid lead screw, the number of projected image of the point of pressure contact between the above-mentioned conversion mechanism and the above-mentioned lead screw is at least three.

(2) The lens driving device described in item (1) above, wherein the above-mentioned conversion mechanism and the above-mentioned moving lens frame are engaged detachably.

DETAILED DESCRIPTION OF THE PREFERRED EMBODIMENT

Next, examples of the present invention will be explained, referring to attached FIGS. 1 through 5(d).

Figure 1:
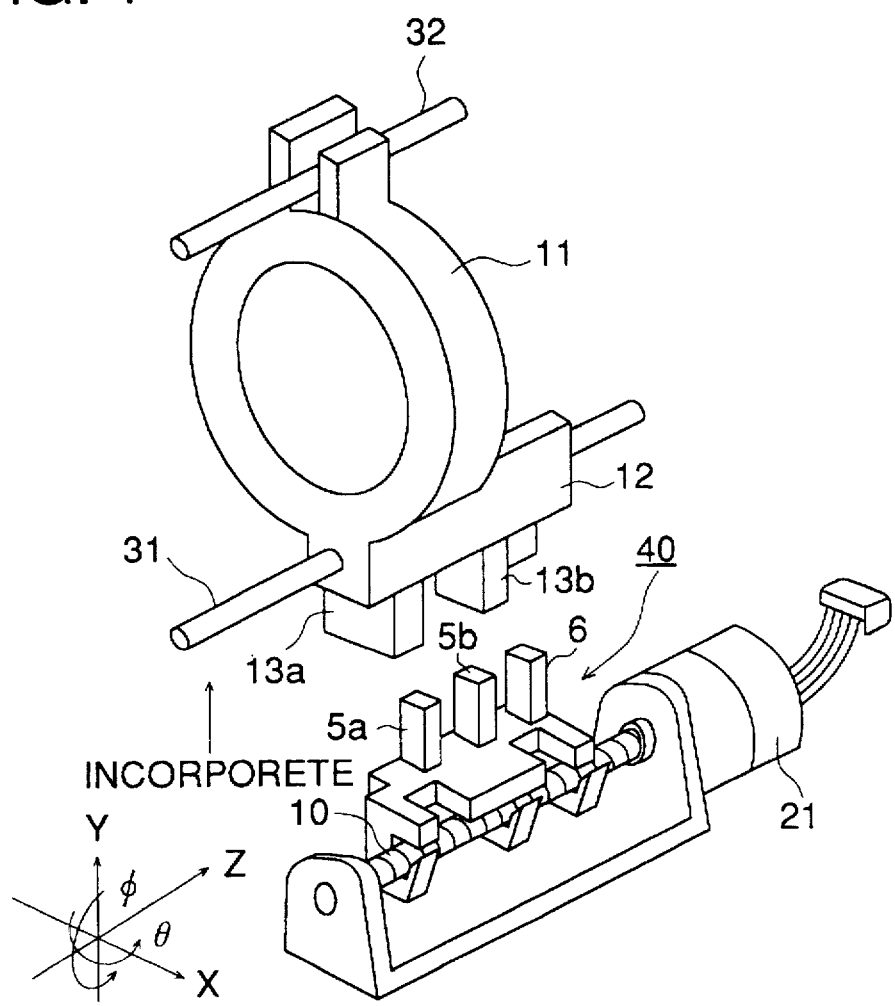
FIG. 1 is an overall schematic perspective view of an example of the present invention.
Figure 2:
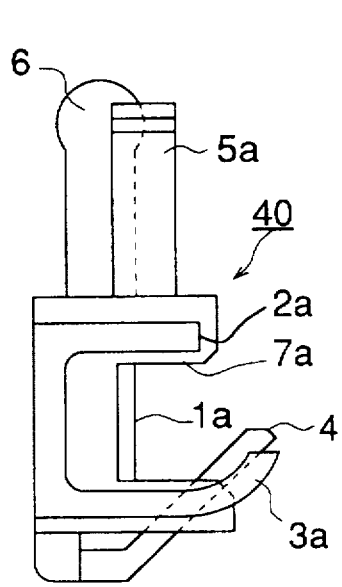
FIGS. 2(a) through 2(d) are schematic drawings of an example of the present invention and drawings showing a carriage unit which engages with a lead screw.
Figure 2:
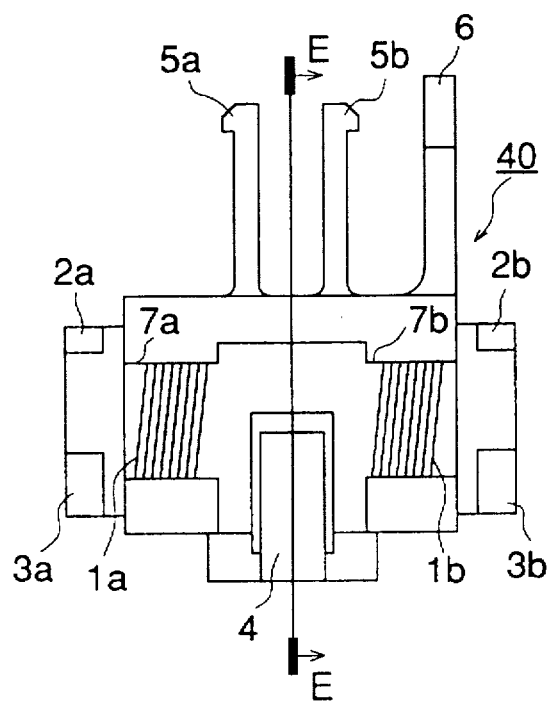
Figure 2:
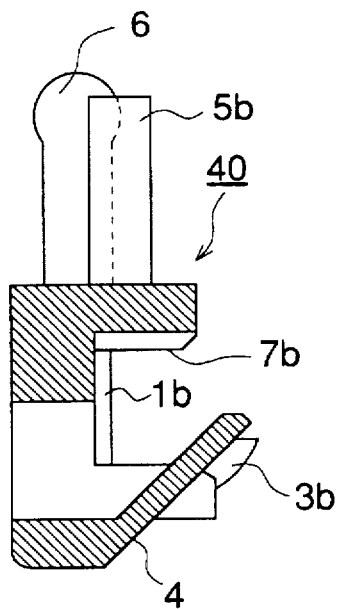
Figure 2:
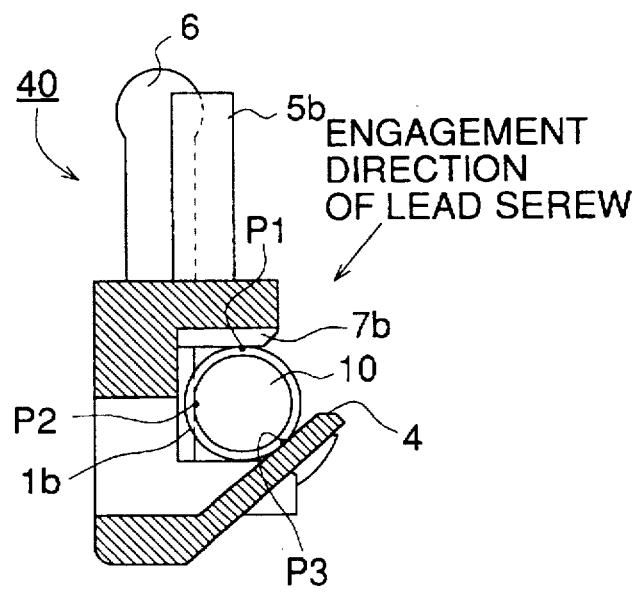
Figure 3:
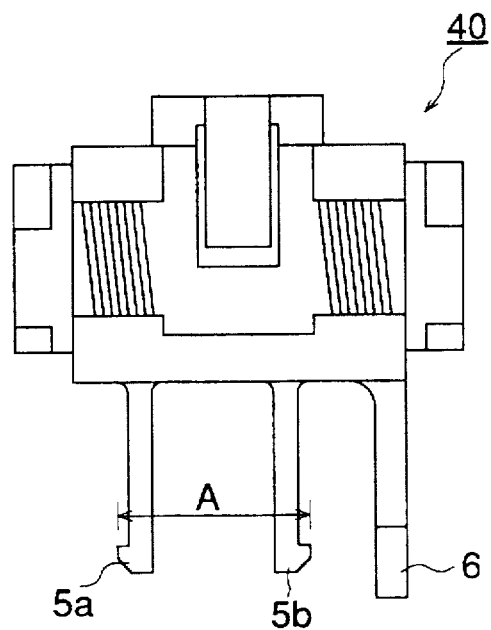
FIGS. 3(a) through 3(d) are schematic drawings of an example of the present invention and drawings showing a connection portion which connects a carriage unit to a moving lens frame.
Figure 3:
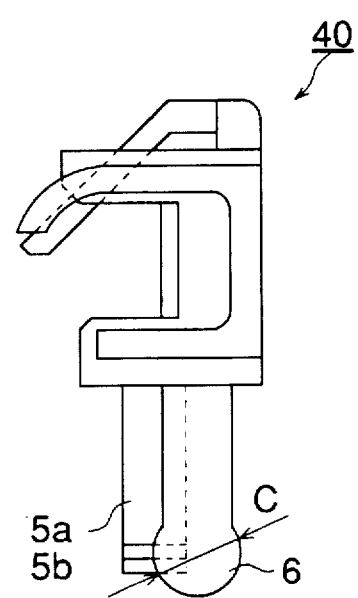
Figure 3:
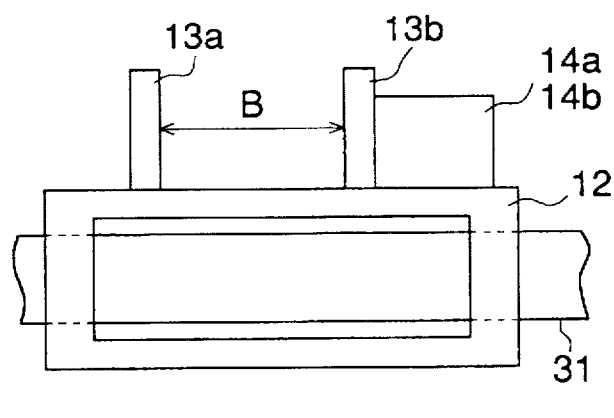
Figure 3:
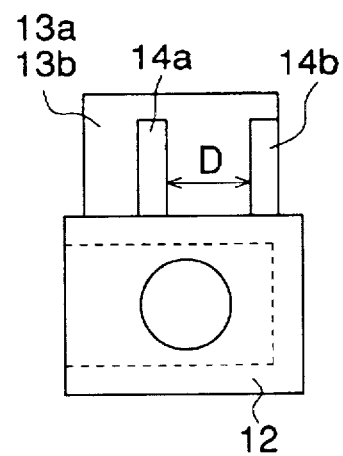
Figure 4:
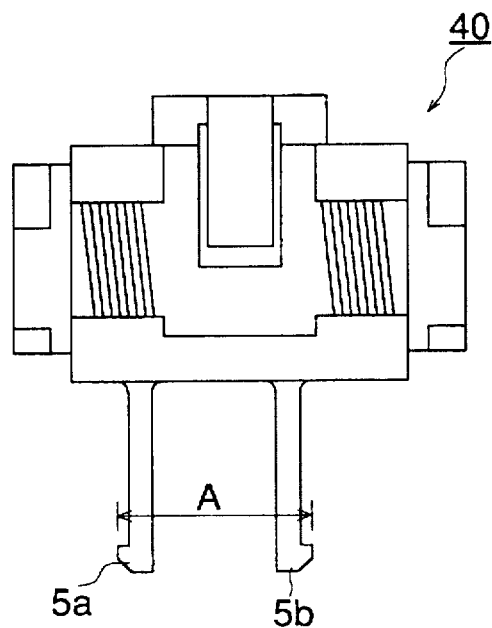
FIGS. 4(a) through 4(d) are schematic drawings of another example of the present invention.
Figure 4:
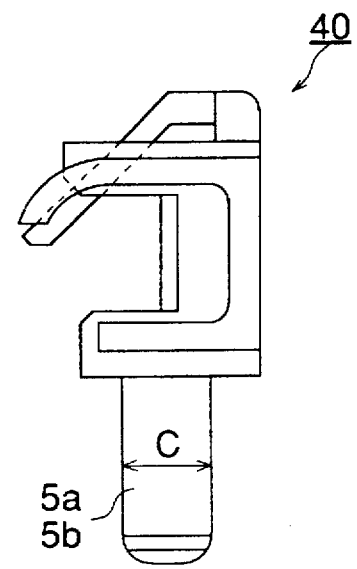
Figure 4:
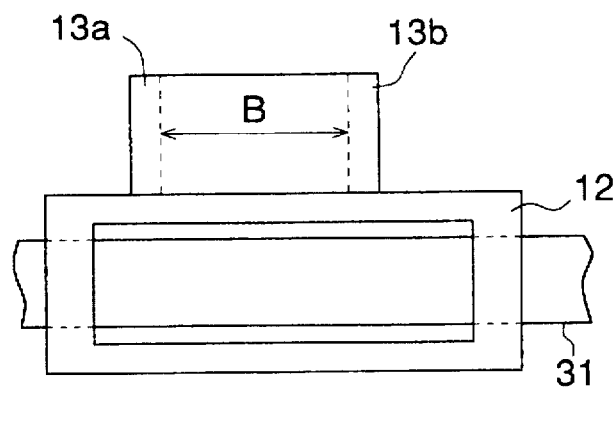
Figure 4:
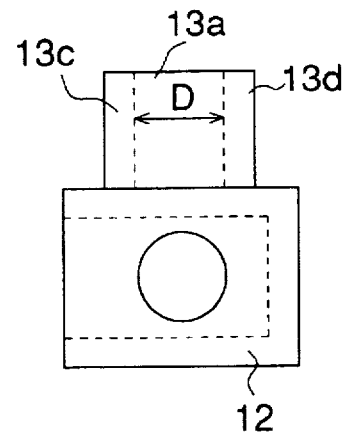
Figure 5A:
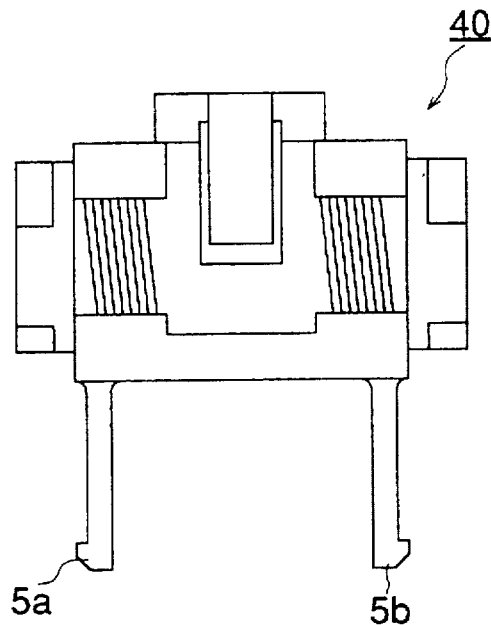
FIGS. 5(a) through 5(d) are schematic drawings of still another example of the present invention.
Figure 5B:
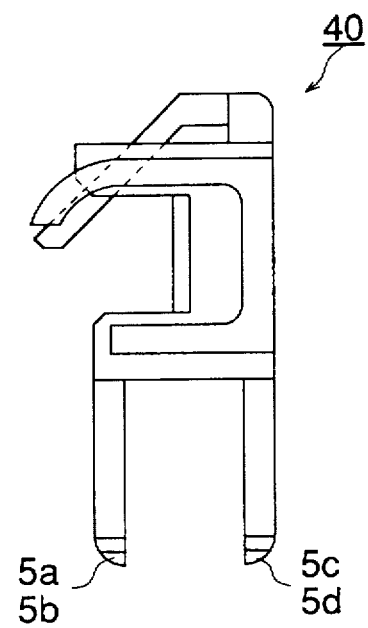
Figure 5C:
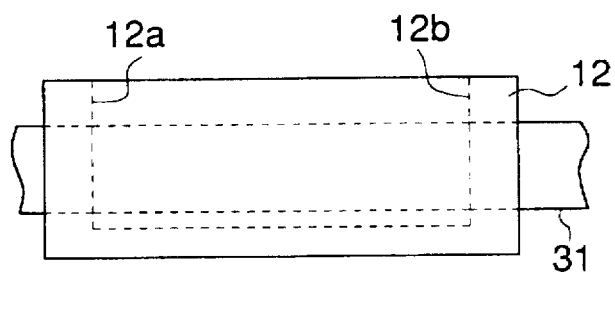
Figure 5D:
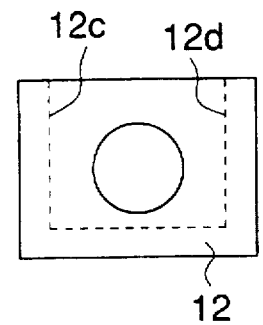
Figure 6:
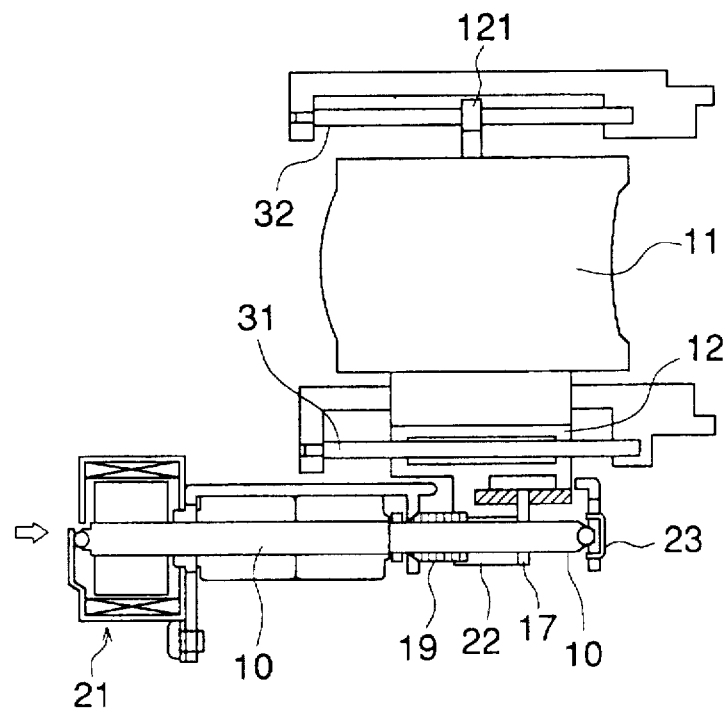
FIGS. 6(a) and 6(b) show a central cross-sectional view 6(a) and a front view 6(b) of a conventional example.
Figure 6:
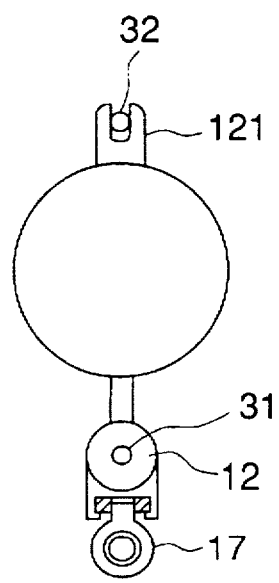
Figure 7:
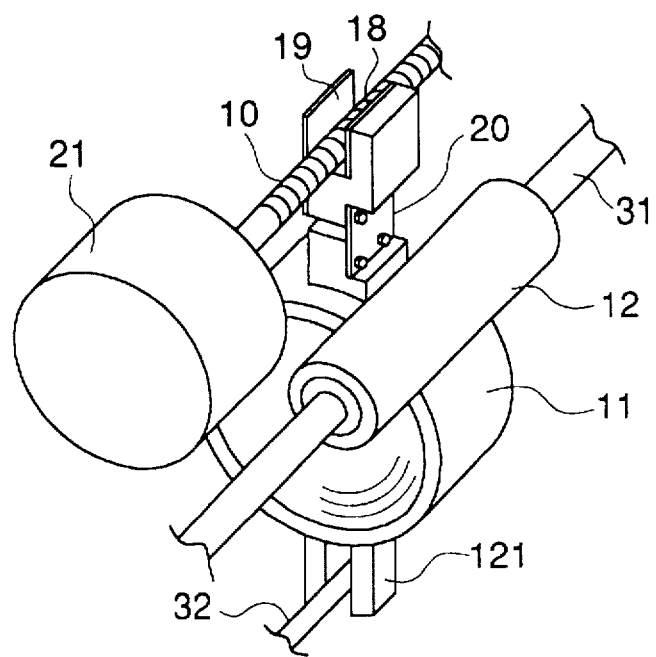
FIGS. 7(a) and 7(b) are perspective view 7(a) and a front view 7(b) of another conventional example.
Figure 7:
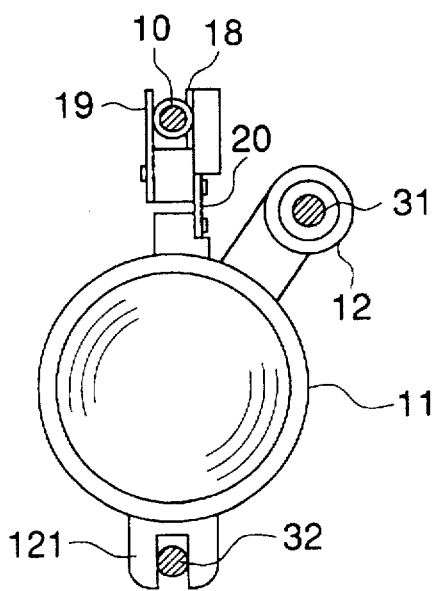

Firstly, an example of the present invention will be explained in detail, referring to FIGS. 1, 2(a) through 2(d) and 3(a) through 3(d). FIG. 1 is a schematic perspective view. FIGS. 2(a) through 2(d) and 3(a) through 3(d) are schematic view of the present invention. FIGS. 2(a) through 2(d) are drawings of a carriage unit which engages with a lead screw, wherein FIG. 2(a) shows a front view, FIG. 2(b) shows a right side view, 2(c) is a view of cross-section E—E of 2(b) and 2(d) shows another view of cross section E—E of 2(b). FIGS. 3(a) through 3(d) are drawings of a connection portion which connects a carriage unit onto a moving lens frame, wherein FIG. 3(a) is a right side view when the carriage unit is reversed, FIG. 3(b) is a front view of the carriage unit, FIG. 3(c) is a right side view of the connection unit of the moving lens frame and FIG. 3(d) is a front view of the connection unit.

In FIGS. 1 and 2(a) through 2(d), moving lens frame 11 is retained movable in an optical axis direction by guide bars 31 and 32 which are guides introducing aforesaid moving lens frame in an optical axis direction. Carriage unit 40 is engaged with lead screw 10 and is integral with an output shaft of stepping motor 21. By coupling the above-mentioned carriage unit 40 to moving lens frame 11, rotational movement of lead screw 10 is converted to linear movement so that the above-mentioned moving lens frame 11 moves parallel to the optical axis.

Lead (L) in the lead screw means a distance in which the carriage moves when the lead screw rotates for one rotation. In the example, the carriage moves by 0.6 mm per one lead screw rotation.

A stepping motor is adopted for the drive source. In the examples, it can be controlled in such a manner that the stepping motor rotates by δ=9° per one pulse.

As described in FIGS. 2(a) through 2(d), carriage unit 40 of the present invention is provided with carriage unit screw portions 1a and 1b, lead screw support portions 7a and 7b, lead screw pressure portion 4, carriage unit connection shoes 5a and 5b, carriage unit rotation prevention portion 6 and carriage unit detachment-prevention portions 2a, 3a, 2b and 3b. In the present example, carriage unit 40 is made of an integral molded parts. However, it may be an aggregate of individual separate parts.

In order to engage lead screw 10 into the above-mentioned carriage unit 40, if lead screw 10 is pushed in the engagement direction as shown in FIG. 2(d), the lead screw deforms out carriage detachment-prevention portions 2a, 3a, 2b and 3b so that lead screw 10 is set as shown in FIG. 2(d). In this occasion, due to the springing property of lead screw pressure portion 4, lead screw 10 is caused to press carriage unit spring portions 1a and 1b and lead screw protrusion unit 7a and 7b. In other words, carriage unit 40 presses lead screw 10 at five points of carriage unit spring portions 1a and 1b and lead screw support portions 7a and 7b, and lead screw pressure portion 4 for structuring a conversion mechanism which converts the rotation motion of lead screw 10 to linear motion aligned with the lens optical axis.

Figure 8:
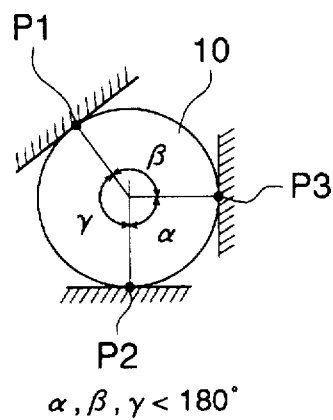
FIG. 8 is a drawing showing projected images of three pressure points in the example in accordance with the present invention.

When 5 of the above-mentioned pressure contact points on carriage unit 40 which presses the outer surface of lead screw 10 are projected onto a plane perpendicular to the axis of lead screw 10, the projected image shows at least 3 points of contact, i.e., P1, P2 and P3. As shown in FIG. 8, each angle (α, β and γ) formed by two adjoining points among aforesaid three points is less than 180°. Therefore, carriage unit 40 rotate and supports lead screw 10 with its axis as a center so that the rotation of lead screw 10 becomes smooth. In other words, carriage unit 40 has the same effect as a conventional nut. In addition, since carriage unit screw portions 1a and 1b are pressed onto lead screw 10 due to lead screw pressure portion 4, the backlash of this carriage unit 40 on lead screw 10 is also eliminated.

Merits when there are three projected images of the pressure points.

Figure 9:
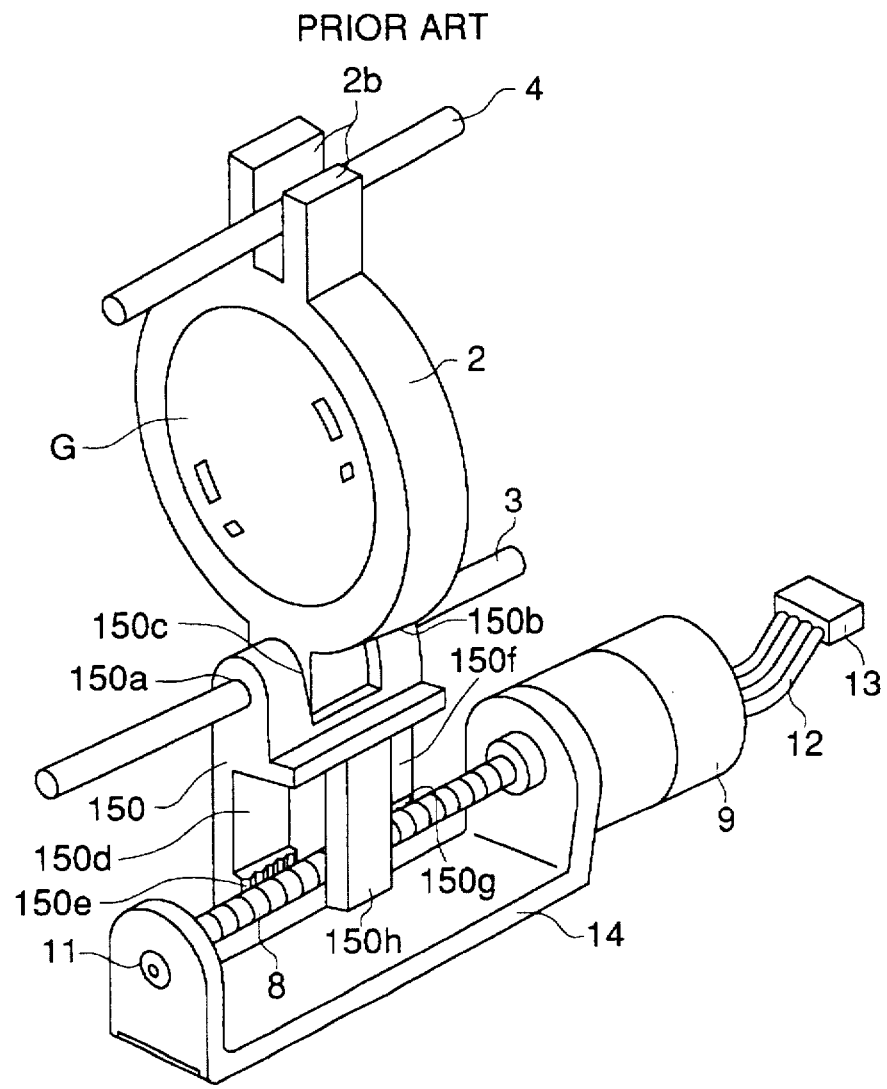
FIG. 9 is a drawing showing a carriage holding mechanism of another conventional example.

If the number of projected images of the pressure point is two, the carriage cannot be retained by themselves only. Therefore, it is necessary to provide retention function of the carriage. If the retention function is provided on the lens barrel frame (moving lens frame), for example, a constitution as shown in FIG. 9 is considered, accuracy in the hole portions (150a and 150b) corresponding to guide pin (3) of carriage (150) is necessary, and concurrently with this, sliding resistance when the guide pin of the carriage is moved is not desirable because it becomes load on the motor.

In addition, carriage unit detachment prevention portions 2a, 3a, 2b and 3b prevent carriage unit 40 from separating from lead screw 10 due to vibration or shock. The above-mentioned carriage unit detachment prevention portions 2a, 3a, 2b and 3b are incorporated with a minute clearance with lead screw 10 when carriage unit 40 is properly mounted on lead screw 10.

As described above, the above-mentioned carriage unit 40 presses lead screw 10 at 5 points by means of lead screw pressure portion 4. However, the above-mentioned pressure must be kept at minimum. More than necessary pressure is not desirable because it leads to increase of driving torque on lead screw 10. Namely, the above-mentioned lead screw pressure portion 4 is not responsible for preventing detachment of lead screw 10 from carriage unit 40 due to vibration or shock. Accordingly, if the present invention is used only under static status, the above-mentioned carriage unit detaching prevention portion 2a, 3a, 2b and 2b may be eliminated.

Due to the above-mentioned structure of the present invention, it is not necessary to thrust nut 17 from the front edge of lead screw 10 as in the first conventional example describe above. The nut can speedily be set to any desired position from the side of lead screw 10. In addition, under the above-mentioned set conditions, the backlash of this carriage 40 is damped as described above due to the effect of lead screw pressure portion 4. Therefore, after that, the above-mentioned carriage unit 40 may be connected to moving lens frame 11. FIGS. 3(a) through 3(d) show detailed drawings on the above-mentioned connection portion.

In FIGS. 3(a) through 3(d), carriage unit connection shoes 5a and 5b is inserted in connection hooks 13a and 13b provided on bushing 12 which is a part of moving lens frame 11. In addition, concurrently with this, carriage unit rotation prevention portion 6 may be inserted into rotation hooks 14a and 14b provided on bushing 12. Distance A is slightly longer than distance B. When inserting carriage unit rotation prevention portion 6, carriage unit connection shoes 5a and 5b are set with elastic deformation in the optical axis direction. Therefore, the above-mentioned carriage unit 40 has no play against bushing 12 in the optical axis direction (the direction of guide bars 31 and 32). In addition, dimension C is slightly smaller than dimension D. After carriage unit rotation preventing portion 6 is inserted into rotation hooks 14a and 14b, it is responsible only for stopping the rotation of carriage unit 40. No useless force is applied to carriage unit 40 or bushing 12.

This is a major difference from the above-mentioned second conventional example. The structure of the second conventional example is such that engaging material 18 and damper composed of plate spring 19 are connected together by means of moving lens frame 11 and connection member 20 and, following this, lead screw 10 is engaged with aforesaid clamper. In this structure, since connection member for moving lens frame and the damper is a plate spring, this plate spring which is a connection member 20 is tortured unless lead screw 10 and guide bars 31 and 32 are perfectly aligned providing great force on the damper and bushing 12 so that driving resistance is increased. However, in the case of the structure of the present invention, there is no restrictive element except in the optical axis direction (the direction of guides 31 and 32). Even when the degree of parallelness between lead screw 10 and guide bars 31 and 32 is more or less wrong, the driving resistance does not increase. Accordingly, moving lens 11 moves smoothly without backlash, vibration or noise.

Next, as shown in FIGS. 3(a) through 3(d), clearance provided between the carriage unit connection shoes and the connection hooks provided on the moving lens frame.

When the above-mentioned carriage unit connection shoes and the above-mentioned connection hooks are engaged detachably while having clearance (a) which satisfies the following inequality in the optical axis direction, there are following merits:

When there is no clearance, the carriage vibrates due to rotation of the screw. On the other hand, when there is clearance, this vibration does not tend to be transferred directly to the moving lens frame. Accordingly, distortion of the images, noise and vibration of the overall lens barrel due to the vibration of the lens moving frame can be prevented.

In addition, if the above-mentioned clearance is too large, accurate control cannot be conducted due to its excessive play.

L: Lead of the lead screw

δ: Rotation angle in one pulse of the driving source (stepping motor) a<L·δ/360°

In addition, "B–A", i.e. difference between "A" in FIG. 3(a) and "B" in FIG. 3(c) corresponds to clearance a. In this example, L·δ/360=0.015 mm (15 μm). The clearance is arranged to be 10 μm or less, considering dispersion in such a manner that it is less than L·δ/360.

When explaining in FIG. 1, in the present invention, provided that the axis of guide bar 31 is Z axis, the above-mentioned movement scarcely affects the slippage of the parallel position of lead screw 10 in the Y direction and the slippage of rotation position in the φ direction, and only slightly affects the slippage of parallel position in the X direction and slippage in the θ direction. In the second conventional example, any of the 4 positions slippage remarkably affected driving. The present invention reduces processing control in the mass production of the unit, therefore it is noticeably advantageous in terms of cost.

The structure of the connection unit is not limited to the above. As shown in FIGS. 4(a) through 4(d), carriage unit connection shoes 5a and 5b function as carriage unit rotation prevention portion 6 too. Namely, rotation engaging portions 13c and 13d are provided in place of rotation engaging portions 14a and 14b on connection engaging portions 13a and 13b, and the width of carriage unit connection shoes 5a and 5b is C as shown in FIG. 4(b). Relationship between sizes A, B, C and D is the same as in the first example explained in FIGS. 1 through 3. It goes without saying that the form of carriage unit connection shoes 5a and 5b is not limited thereto, provided that the stated objects are attained.

There is another method as shown in FIGS. 5(a) through 5(d), wherein the number of the carriage unit connection shoe is increased to 4 (carriage unit connection shoes 5a, 5b, 5c and 5d), inner walls 12a and 12b of bushing 12 function as the connection engaging portion and inner walls 12c and 12d function as the rotation engaging portion. In this occasion, carriage unit connection shoes 5a, 5b, 5c and 5d are inserted near the passage hole of guide bar 31 on bushing 12 in which friction force with guide bar 31 is effected. Therefore, the above-mentioned mechanism is extremely effective for noticeably reducing moment which rotates bush 12. In addition, overall space necessary can be minimized.

As is understood from the above-mentioned explanations, in a lens driving device of the present invention, a conversion mechanism which converts rotational movement of lead screw 10 to lateral movement parallel to the optical axis (parallel with guide bars 31 and 32) and moving lens frame 11 are detachable when guide bars 31 and 32 are removed from moving lens frame 11, facilitating assembly and enabling assembly cost inexpensive.

Owing to the present invention, a moving lens frame on a lens barrel can be moved smoothly without backlash, vibration or noise by means of an integral driving source. A lens driving device enabling a downsized lens barrel, with a simple structure, whose assembly cost is inexpensive accordingly.

What is claimed is:

1. A lens driving device comprising:
   (a) a lens frame for holding a photographic lens;
   (b) a guide member for guiding the lens frame in a direction of an optical axis of the lens;
   (c) a lead screw for moving the lens frame in the optical axis direction, said lead screw having a rotational axis;
   (d) a drive source for rotating the lead screw;
   (e) a carriage in pressure contact with the lead screw for converting rotational motion of the lead screw to linear motion in a direction parallel to the optical axis direction which is a moving direction of the guide member, and
   (f) at least three pressure contact points between the carriage and the lead screw, said pressure contact points being positioned about said rotational axis of said lead screw such that when said pressure contact points are projected onto a plane which is perpendicular to said rotational axis of said lead screw, there are at least three pressure contact points on said plane.

2. The lens driving device of claim 1, wherein on said plane on which said contact points have been projected, adjacent contact points form an angle of less than 180° with said rotational axis of said lead screw.

3. The lens driving device of claim 1, wherein the carriage is detachably engaged with the lens frame.

4. The lens driving device of claim 1, wherein the carriage includes connection shoes having an elastic deformation property in the optical axis direction.

5. The lens driving device of claim 4, wherein the lens frame includes a connection hook for engaging with the connection shoes provided on the carriage.

6. The lens driving device of claim 5, wherein a clearance (a) between the connection shoes and the connection hooks satisfies the following inequality:

$$a < L \cdot \theta / 360°$$

where L represents a lead of the lead screw, and θ represents a rotation angle in a pulse of the drive source.

* * * * *